United States Patent Office 3,264,202
Patented August 2, 1966

3,264,202
IONIZING RADIATION OF WATER SOLUTION OF POLYALKYLENE OXIDE AND PRODUCT THEREOF
Paul A. King, Warwick, N.Y., assignor to Union Carbide Corporation, a corporation of New York
No Drawing. Filed June 13, 1961, Ser. No. 116,671
6 Claims. (Cl. 204—159.14)

The present invention relates to a new class of polymeric compounds containing novel carbon to carbon crosslinking bonds and a new process utilizing ionizing radiation for preparation of such compounds.

At the present state of the art polymers in general are crosslinked by carbon to carbon bonding in chemical processes. Polymers containing the R.O.R. linkage such as polymers and/or copolymers of ethylene oxide and propylene oxide are not known to be amenable to crosslinking by carbon to carbon bonding even when chemical means are utilized.

An object of the present invention is to provide novel polymeric materials containing carbon to carbon crosslinking bonds alpha to the oxygen in an ether linkage.

It is another object of the present invention to provide novel macro-molecular polymeric materials which are insoluble in water and organic liquids and which contain intra and inter molecular carbon to carbon cross-linking bonds and which polymeric materials are stable in the presence of oxygen.

It is a further object to provide novel, gel-like materials comprising a matrix which is stable in the presence of oxygen and which consists of polymeric materials containing intra and inter molecular carbon to carbon crosslinking bonds and wherein the matrix reversibly holds large amounts of water.

The present novel polymeric compounds contain at least one of the structural units selected from the following group wherein said structural unit is stable in the presence of oxygen:

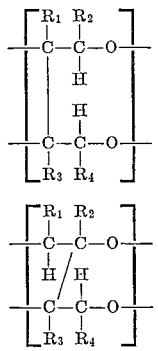

wherein $R_1$ is hydrogen when $R_2$ is selected from the group consisting of hydrogen and methyl radicals; $R_2$ is hydrogen when $R_1$ is selected from the group consisting of hydrogen and methyl radicals; $R_3$ is hydrogen when $R_4$ is selected from the group consisting of hydrogen and methyl radicals; and wherein $R_4$ is hydrogen when $R_3$ is selected from the group consisting of hydrogen and methyl radicals.

The novel compounds disclosed herein further may include carbon to carbon crosslinking between straight chain carbon atoms and the carbon atoms of branch chain methyl groups and between the carbon atoms of branch chain methyl groups themselves. In addition a very minor and insignificant number of bonds may include two oxygen atoms linking the carbon atoms.

The present compounds may contain crosslinking bonds present as inter-molecular bonds (e.g. between two different molecules) and intramolecular bonds (e.g. between carbon atoms of the same molecule) and combinations of intra and intermolecular crosslinking bonds.

The term "crosslinking" is utilized herein to define the process whereby a new carbon to carbon bond is formed in an organic polymer. The bond may link two carbon atoms of two different polymers or may link two carbon atoms of the same polymer.

The process for producing the novel compounds comprises preparing a homogeneous water solution of at least one of the water soluble compounds selected from the following class of compounds:

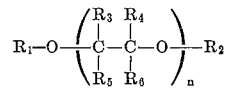

wherein $R_1$ and $R_2$ are selected from the group consisting of hydrogen, alkyl radicals and alkyl substituted aryl radicals, $R_3$ is hydrogen when $R_4$ is selected from the group consisting of hydrogen and methyl radicals, $R_4$ is hydrogen when $R_3$ is selected from the group consisting of hydrogen and methyl radicals, $R_5$ is hydrogen when $R_6$ is selected from the group consisting of hydrogen and methyl radicals, $R_6$ is hydrogen when $R_5$ is selected from the group consisting of hydrogen and methyl radicals, and $n$ is greater than one; submitting the solution to ionizing radiation for a period of time sufficient to cause a change in viscosity of the solution; removing the water from the solution and recovering the residue. The residue contains polymers having the hereinbefore described crosslinking bonds.

Ionizing radiation has been defined as comprising the alpha and beta species of particles which possess a level of energy sufficient to remove orbital electrons from atoms by passing in close proximity to the atoms. The alpha and beta species of particles cause direct ionization of atoms.

Gamma rays and X-rays do not consist of particles and carry no electrical charge but their passage through matter results in indirect ionization by causing the ejection of electrons from atoms. These secondary electrons in turn produce ionization in a manner similar to beta particles.

For the specific purpose of describing the present invention and in the appended claims the phrase "ionizing radiation" will be utilized to include alpha particles, beta particles, X-rays and gamma rays and electrons from Van De Graff and other high voltage accelerators.

The starting solution upon irradiation generally exhibits an initial decrease in viscosity. As irradiation continues the solution increases in viscosity through the viscosity level of the starting solution and upon continued irradiation a macro molecular gel-like material is formed.

Irradiation of water is thought to result in the following reaction:

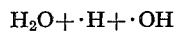

The hydrogen atoms and hydroxyl radicals formed through the interaction of ioinizing radiation with water are capable of reacting with certain types of organic compounds. One common reaction is the abstraction of a hydrogen atom by the water radicals to give either $H_2O$ or $H_2$ and a substituted carbon radical. Two of these carbon atoms can combine to form a new carbon to carbon bond or crosslink.

The initial decrease in viscosity may be due to a combination of crosslinking and degradation or to crosslinking which changes the shape of the molecule to cause a smaller swept volume. The viscosity begins to rise after the number of crosslinked molecules is substantially increased.

Continued irradiation eventually causes the formation of a sufficient number of carbon to carbon crosslinking bonds to result in the transformation of the solution into an insoluble gel-like material. The matrix of the gel-like material consists of starting polymers which have been intra- and/or inter-molecularly crosslinked in the structural manner shown above and to a sufficient extent to form a macro molecular material. The water is reversibly held in the interstices of the resulting high molecular weight material. In addition, the crosslinked matrix may contain entwined starting polymers which are not crosslinked but which are so entwined with the crosslinked matrix that they remain substantially insoluble.

The water may be removed from the matrix by various processes, including simple evaporation processes, to produce a tough elastic material which will reversibly pick up water upon contact therewith by sorption in amounts approximately equal to the original capacity of the gel-like material resulting from the continued irradiation of the starting solution. Water removal and pickup by the matrix can be carried on reversibly any desired number of times.

Polymeric starting materials amenable for use in the present process are those compositions containing ether linkages. They include (1) copolymers of ethylene oxide and propylene oxide containing either hydrogen, alkyl or alkyl substituted end groups wherein the percentage of ethylene oxide polymer in the copolymer ranges from about 50 to 75 percent, (2) polypropylene gloycol, polyethylene glycol, ethylene oxide polymers ranging in molecular weight from about 200 to about $10 \times 10^6$ (3) alkyl substituted phenyl esters of ethylene oxide polymers, alkyl and dialkyl ethers of polyethylene glycol.

It is preferred that the water starting solutions be void of scavenging agents. The term "scavenging agents" denotes those species which react with the reactive agent produced by the irradiation of water and/or those species which react with the organic radicals formed during the present process. While very pure water is the preferred solvent for the starting solution, the presence of small amounts of scavenging agents is not determental to the operability of the present process since they will react during the early part of the irradiation period and are eventually expended leaving the desired crosslinking reaction to proceed uninhibited.

Oxygen is an example of a scavenger which will react with hydrogen atoms and/or organic radicals. After a short period of time the oxygen is expended and carbon to carbon crosslinking can occur uninhibited.

The pH of the solution apparently is not critical to the operability of the present process although the time required to cause formation of the gel-like material can be considerably shortened by utilizing a starting solution having a pH of about 7.0.

Temperature apparently is not critical to the operability of the present process since the gel-like material has been formed in solutions having a temperature of just above the freezing point up to the boiling point of the starting solution.

Three inter-related process variables which should be taken into account in conducting the present process efficiently are dosage, concentration of the starting polymeric solute and the molecular weight of the starting polymeric solute.

Dosage (e.g. energy absorption) will be described herein in terms of rads. A rad corresponds to an energy of absorption of 100 ergs/gram of material treated.

Increasing concentrations of the starting solute in the starting solution generally lead to lower dosage requirements to cause formation of the gel-like material. Increasing the molcecular weight of the sarting solute generally has an analogous effect on the dosage required to cause formation of the gel-like material.

It has been found that if irradiation is continued in any given process to the extent that the solution is transformed into a gel-like material, the final gel-like material will contain progressively larger amounts of water if the concentration of the starting solute is progressively decreased.

The gel-like material has utility as a humidifier. The crosslinked but still soluble materials have the same utility as the starting solute and in addition can be utilized as an intermediate for efficient preparation of the gel-like material. The crosslinked and insoluble material has utility in preparation of the gel-like materials.

A more extended discussion of the use of the polymers of ethylene oxide as starting solutes in the present invention to produce new compounds containing the herein disclosed novel crosslinking bonds may aid in further understanding the invention.

In the treatment of polymers of ethylene oxide in accordance with the present process it is preferred to utilize poly(ethylene oxide) having a molecular weight ranging from about $1 \times 10^5$ to about $3 \times 10^6$; a starting water solution containing at least about 2.0 weight percent of poly(ethylene oxide); and submitting the starting solution to a total irradiation dosage of at least about $52.0 \times 10^4$ rads to produce the gel-like material.

Table I is a tabulation of the results obtained by irradiating polymers of ethylene oxide of various molecular weights under varying conditions, as noted, to produce a final gel-like material.

*Table I*

| | Molecular Weight | Con. Weight Percent | Atmosphere | Type of Radiation | Dosage In Rads | Wt. percent $H_2O$ in the Gel-like Material | Viscosity in Centipoises |
|---|---|---|---|---|---|---|---|
| 1 | $\sim 3.0 \times 10^6$ | 2 | Air | X-ray | | 98 | Gel. |
| 2 | $\sim 3.0 \times 10^6$ | 2.6 | $N_2$ | X-ray | $0.1 \times 10^6$ | 97.4 | Gel. |
| 3 | $\sim 3.0 \times 10^6$ | 2.6 | $N_2$ | X-ray | $2 \times 10^6$ | 98 | Gel. |
| 4 | $\sim 3.0 \times 10^6$ | 2.0 | Air | $\gamma$ | $1.6 \times 10^6$ | 98 | Gel. |
| 5 | $\sim 3.0 \times 10^6$ | 2.0 | Air | $\gamma$ | $6.3 \times 10^6$ | | Brittle gel. |
| 6 | $\sim 3.0 \times 10^6$ | 2.5 | Air | $\gamma$ | $1.9 \times 10^6$ | 96.5 | Gel. |
| 7 | $\sim 3.0 \times 10^6$ | 2.0 | Air | $\gamma$ | $0.5 \times 10^6$ | 97.7 | Gel. |
| 8 | $\sim 3.0 \times 10^6$ | 0.5 | Air | X-ray | $0.3 \times 10^6$ | 99 | Gel. |
| 9 | $\sim 3.0 \times 10^5$ | 3.0 | Air | X-ray | $1 \times 10^6$ | 98 | Gel. |
| 10 | $\sim 3.0 \times 10^5$ $\sim 3.0 \times 10^6$ | 0.5 | Air | X-ray | $3 \times 10^6$ | 99 | Gel. |
| 11 | $\sim 3.0 \times 10^6$ | 2.0 | Air | $e^-$ | $0.67 \times 10^6$ | 98 | Gel. |

The gel-like material produced by the present process utilizing ethylene oxide polymers as a starting solution can be dried to remove the water therefrom. Upon drying the gel-like material gradually shrinks and eventually becomes a tough elastic material exhibiting a light color. The water-free matrix is insoluble in water and several organic liquids including methanol, benzyl alcohol, formic acid, acrylic acid, benzene, nitro-benzene, chlorobenzene, m-cresol, o-nitro-toluene pyridine morpholine, chloroform, 2-nitropropane and dioxane.

The following tables show the decrease in viscosity exhibited by starting solutions of poly(ethylene oxide) after initial irradiation treatment with the subsequent increase in viscosity and eventually the formation of a gel-like material.

Table II correlates the dosage and viscosity of a homogeneous water solution containing 0.1 weight percent poly(ethylene oxide) of an initial molecular weight of approximately $3 \times 10^6$. The solution was irradiated with gamma rays under a nitrogen atmosphere. Viscosity measurements were made by the falling ball technique with a Hoeppler viscometer at 20° C. after dilution of the irradiated sample from a 1.0 to 0.1 weight percent concentration.

*Table II*

| Dose in Rads×$10^4$ | Viscosity in centipoise |
| --- | --- |
| 0.0 | 2.97 |
| 1.3 | 1.42 |
| 1.9 | 1.33 |
| 3.0 | 1.35 |
| 3.17 | 1.40 |
| 4.9 | 1.48 |
| 11 | Gel-like |

Table III correlates the dosage and viscosity of a homogeneous water solution containing 0.2 weight percent poly(ethylene oxide) of approximately an initial molecular weight of $3 \times 10^5$. The solution was irradiated with gamma rays in atmosphere of air. Viscosity measurements were made by the falling ball technique with a Hoeppler viscometer at 30° C. after dilution of the irradiated sample from a 2.0 to 0.2 weight percent concentration.

*Table III*

| Dose in Rads×$10^4$ | Viscosity in centipoise |
| --- | --- |
| 0.0 | 1.16 |
| 2.38 | 1.03 |
| 7.59 | 0.94 |
| 12.5 | 0.96 |
| 49.6 | 0.93 |
| 22.2 | 1.12 |
| 62.6 | Gel-like |

To further illustrate the scope of the present invention a copolymer composed of approximately 75 weight percent ethylene oxide and 25 weight percent propylene oxide in a homogeneous solution with water was irradiated with gamma rays for a period of time sufficient to cause formation of a gel-like material. The total dosage was approximately $15.6 \times 10^6$ rads.

What is claimed is:

1. A process comprising preparing a homogeneous water solution containing at least one of the following water soluble solutes:

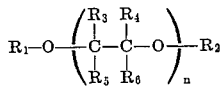

wherein $R_1$ and $R_2$ are selected from the group consisting of hydrogen, alkyl radicals and alkyl substituted aryl radicals, and wherein $R_3$ is hydrogen when $R_4$ is selected from the group consisting of hydrogen and methyl radicals, $R_4$ is hydrogen when $R_3$ is selected from the group consisting of hydrogen and methyl radicals, $R_5$ is hydrogen when $R_6$ is selected from the group consisting of hydrogen and methyl radicals, and $R_6$ is hydrogen when $R_5$ is selected from the group consisting of hydrogen and methyl radicals, and $n$ is greater than one; and submitting said solution to ionizing radiation for a period of time sufficient to cause formation of a gel-like material.

2. The product produced by the process comprising preparing a homogeneous water solution containing at least one of the following water soluble solutes:

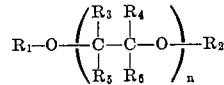

wherein $R_1$ and $R_2$ are selected from the group consisting of hydrogen, alkyl radicals and alkyl substituted aryl radicals, and wherein $R_3$ is hydrogen when $R_4$ is selected from the group consisting of hydrogen and methyl radicals, $R_4$ is hydrogen when $R_3$ is selected from the group consisting of hydrogen and methyl radicals, $R_5$ is hydrogen when $R_6$ is selected from the group consisting of hydrogen and methyl radicals, and $R_6$ is hydrogen when $R_5$ is selected from the group consisting of hydrogen and methyl radicals, and $n$ is greater than one; and submitting said solution to ionizing radiation for a period of time sufficient to cause formation of a gel-like material.

3. A process comprising preparing a homogeneous water solution containing the following solute;

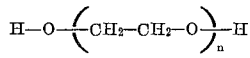

said solute having a molecular weight ranging from about $1 \times 10^5$ to about $3 \times 10^6$ and wherein the concentration of said solute in said water is at least about 2.0 weight percent; and submitting said solution to a total dosage of ionizing radiation of at least about $52.0 \times 10^4$ rads to cause formation of a macro gel-like material.

4. The product prepared by the process comprising preparing a homogeneous water solution containing the following solute;

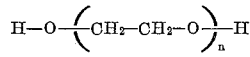

said solute having a molecular weight ranging from about $1 \times 10^5$ to about $3 \times 10^6$ and wherein the concentration of said solute in said water is at least about 2.0 weight percent; and submitting said solution to a total dosage of ionizing radiation of at least about $52.0 \times 10^4$ rads to cause formation of a macro gel-like material.

5. The absorbent product produced by the process comprising preparing a homogeneous water solution containing at least one of the following water soluble solutes:

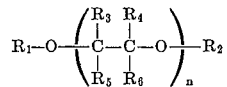

wherein $R_1$ and $R_2$ are selected from the group consisting of hydrogen, alkyl radicals and alkyl substituted aryl radicals, and wherein $R_3$ is hydrogen when $R_4$ is selected from the group consisting of hydrogen and methyl radicals, $R_4$ is hydrogen when $R_3$ is selected from the group consisting of hydrogen and methyl radicals, $R_5$ is hydrogen when $R_6$ is selected from the group consisting of hydrogen and methyl radicals, and $R_6$ is hydrogen when $R_5$ is selected from the group consisting of hydrogen and methyl radicals, and $n$ is greater than one; submitting said solution to ionizing radiation for a period of time sufficient to cause formation of a gel-like material; separating the gel-like material from the solution and drying such material to form an elastic matrix adsorbent.

6. The absorbent product prepared by the process comprising preparing a homogeneous water solution containing the following solute;

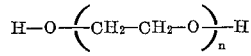

said solute having molecular weight ranging from about $1 \times 10^5$ to about $3 \times 10^6$ and wherein the concentration of said solute in said water is at least about 2.0 weight percent; submitting said solution to a total dosage of ionizing radiation of at least about $52.0 \times 10^4$ rads to cause formation of a gel-like material; separating the gel-like material from the solution and drying such material to form an elastic matrix adsorbent.

References Cited by the Examiner

UNITED STATES PATENTS

| | | | |
|---|---|---|---|
| 2,689,833 | 9/1954 | Hwa | 260—2 |
| 2,765,284 | 10/1956 | Bersworth | 260—2 |
| 2,959,531 | 11/1960 | Wheelock | 204—154 |
| 2,964,454 | 12/1960 | Findley | 204—154 |
| 2,964,455 | 12/1960 | Graham | 204—154 |

FOREIGN PATENTS 761,051   11/1956   Great Britain.

OTHER REFERENCES

Colichman et al.: "Modern Plastics," vol. 35, Oct. 1957, pages 180, 182, 184, 186, and 282.

Kline: "Modern Plastics," vol. 35, Jan. 1958, pages 156–7.

SAMUEL H. BLECH, *Primary Examiner.*

MURRAY TILLMAN, *Examiner.*